(12) United States Patent
Kim et al.

(10) Patent No.: US 10,929,637 B2
(45) Date of Patent: Feb. 23, 2021

(54) ELECTRONIC DEVICE INCLUDING FILLER FOR FILLING A SPACE BETWEEN BIOLOGICAL SENSOR DISPOSED UNDER A DISPLAY AND THE DISPLAY

(71) Applicant: SAMSUNG ELECTRONICS CO., LTD., Suwon-si (KR)

(72) Inventors: Suna Kim, Suwon-si (KR); Jeonghoo Kim, Suwon-si (KR); Kyunghoon Song, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/274,448

(22) Filed: Feb. 13, 2019

(65) Prior Publication Data
US 2019/0251320 A1 Aug. 15, 2019

(30) Foreign Application Priority Data
Feb. 14, 2018 (KR) .................. 10-2018-0018603

(51) Int. Cl.
  *G06K 9/00* (2006.01)
  *G06F 3/044* (2006.01)
  *G06K 9/22* (2006.01)

(52) U.S. Cl.
  CPC ........... *G06K 9/0002* (2013.01); *G06F 3/044* (2013.01); *G06K 9/00053* (2013.01); *G06K 9/22* (2013.01)

(58) Field of Classification Search
  CPC ..... G06K 9/0002; G06K 9/0004; G06F 3/042
  See application file for complete search history.

(56) References Cited

U.S. PATENT DOCUMENTS

| 9,785,299 B2 | 10/2017 | Chen |
| 2003/0060715 A1* | 3/2003 | Sato ........................ G10K 11/02 600/459 |
| 2007/0040477 A1 | 2/2007 | Sugiura et al. |

(Continued)

FOREIGN PATENT DOCUMENTS

| JP | 2015-118014 | 6/2015 |
| KR | 10-1558439 | 10/2015 |

(Continued)

OTHER PUBLICATIONS

Search Report and Written Opinion dated May 17, 2019 in counterpart International Patent Application No. PCT/KR2019/001753.

(Continued)

*Primary Examiner* — Yuzhen Shen
(74) *Attorney, Agent, or Firm* — Nixon & Vanderhye P.C.

(57) ABSTRACT

An electronic device includes: a transparent member comprising a transparent material; a display panel disposed under the transparent member; a shock absorption sheet disposed under the display panel, and having an opening formed in a region thereof; a biological sensor disposed to face the display panel, and disposed in at least a portion of the opening; a filler material filling at least some space in the opening formed between the biological sensor and the display panel; and a seal disposed between the biological sensor and the shock absorption member and configured to prevent the filler from being discharged outside the opening.

16 Claims, 14 Drawing Sheets

(56) References Cited

U.S. PATENT DOCUMENTS

| | | | |
|---|---|---|---|
| 2007/0272020 A1* | 11/2007 | Schneider | H01L 27/20 73/628 |
| 2016/0079663 A1* | 3/2016 | Youm | B29C 45/1671 343/702 |
| 2016/0171271 A1 | 6/2016 | Lundahl | |
| 2017/0110504 A1* | 4/2017 | Panchawagh | B06B 1/0207 |
| 2017/0212613 A1 | 7/2017 | Hwang et al. | |
| 2017/0231534 A1 | 8/2017 | Agassy et al. | |
| 2017/0287992 A1 | 10/2017 | Kwak et al. | |
| 2017/0316243 A1* | 11/2017 | Ghavanini | G06K 9/00899 |
| 2018/0005005 A1 | 1/2018 | He et al. | |
| 2019/0073505 A1* | 3/2019 | Kwon | G06K 9/0004 |

FOREIGN PATENT DOCUMENTS

| | | |
|---|---|---|
| KR | 10-2017-0111827 | 10/2017 |
| KR | 10-2017-0125778 | 11/2017 |

OTHER PUBLICATIONS

European Extended Search Report dated Nov. 30, 2020 for EP Application No. 19755091.6.

* cited by examiner

ELECTRONIC DEVICE INCLUDING FILLER FOR FILLING A SPACE BETWEEN BIOLOGICAL SENSOR DISPOSED UNDER A DISPLAY AND THE DISPLAY

CROSS-REFERENCE TO RELATED APPLICATION

This application is based on and claims priority under 35 U.S.C. § 119 to Korean Patent Application No. 10-2018-0018603, filed on Feb. 14, 2018, in the Korean Intellectual Property Office, the disclosure of which is incorporated by reference herein in its entirety.

BACKGROUND

Field

The present disclosure relates to an electronic device including an ultrasonic sensor.

Description of Related Art

A portable electronic device such as a smartphone may have a plurality of sensors arranged in a main body thereof. The sensors may be arranged on some regions of the front surface or rear surface of the main body. For example, the sensors mounted in the main body may include an image sensor, a biological sensor, an optical sensor, or the like.

In particular, as the biological sensor of the electronic device, for example, a fingerprint sensor, an ultrasonic sensor may be employed. The ultrasonic sensor may recognize a fingerprint by detecting a difference in reflected ultrasonic waves caused by a difference in ridge/valley acoustic impedance.

When an ultrasonic sensor utilized as a fingerprint sensor is disposed in a display of an electronic device, an air gap should not be formed on a sensing path. However, an air gap may be formed due to a liquid adhesive for attaching the ultrasonic sensor, or contraction may be caused when the liquid adhesive is cured, thereby causing a non-uniform attachment surface of the ultrasonic sensor and thus degrading visibility of the display.

The above information is presented as background information only to assist with an understanding of the present disclosure. No determination has been made, and no assertion is made, as to whether any of the above might be applicable as prior art with regard to the present disclosure.

SUMMARY

Various embodiments of the present disclosure provide an electronic device which has recognition performance of a fingerprint sensor enhanced by removing and/or reducing an air gap from a sensing path of an ultrasonic sensor.

Various embodiments of the present disclosure provide an electronic device which can provide a mounting structure of an ultrasonic sensor without or with a reduced air gap on a sensing path formed on a rear surface of a display.

Various embodiments of the present disclosure provide an electronic device which provides a mounting structure capable of mounting an ultrasonic sensor on a rear surface of a display using a filler.

Various embodiments of the present disclosure provide an electronic device which has an acoustic lens disposed on an ultrasonic sensor to be able to improve transmission of an ultrasonic signal.

An electronic device according to various embodiments of the present disclosure includes: a transparent member comprising a transparent material; a display panel disposed under the transparent member; a shock absorption sheet disposed under the display panel, and having an opening formed in a region thereof; a biological sensor disposed to face the display panel, and disposed in at least a portion of the opening; a filler comprising filler material filling at least some space in the opening between the biological sensor and the display panel; and a seal disposed between the biological sensor and the shock absorption member and configured to prevent the filler from being discharged outside of the opening.

An electronic device according to various embodiments of the present disclosure includes: a transparent member comprising a transparent material; a display panel disposed under the transparent member; a biological sensor disposed in a region under the display panel to face the display panel; a filler comprising a filler material filling at least some space between the biological sensor and the display panel; and a seal disposed between the biological sensor and the display panel and configured to surround the biological sensor to substantially prevent the filler from being discharged outside a region defined by the seal.

An electronic device according to various embodiments of the present disclosure includes: a display panel including a first surface facing a first direction, and a second surface facing a second direction opposite the first direction; an opening formed in a region under the display; an ultrasonic sensor disposed in a portion of the opening to face the second surface of the display panel; at least one seal disposed to surround the opening between the display panel and the biological sensor, and configured to seal a region of the opening; and a filler comprising a filler material filling a space formed between the display panel and the ultrasonic sensor and defined by the at least one seal.

Various embodiments of the present disclosure provide a mounting structure of an ultrasonic sensor using a filler on a rear surface of a display, thereby removing and/or reducing an air gap on a sensing path between the ultrasonic sensor and the display, and thus enhancing visibility of the display.

Various embodiments of the present disclosure may add an acoustic lens to the ultrasonic sensor, thereby enhancing fingerprint recognition performance of the ultrasonic sensor.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
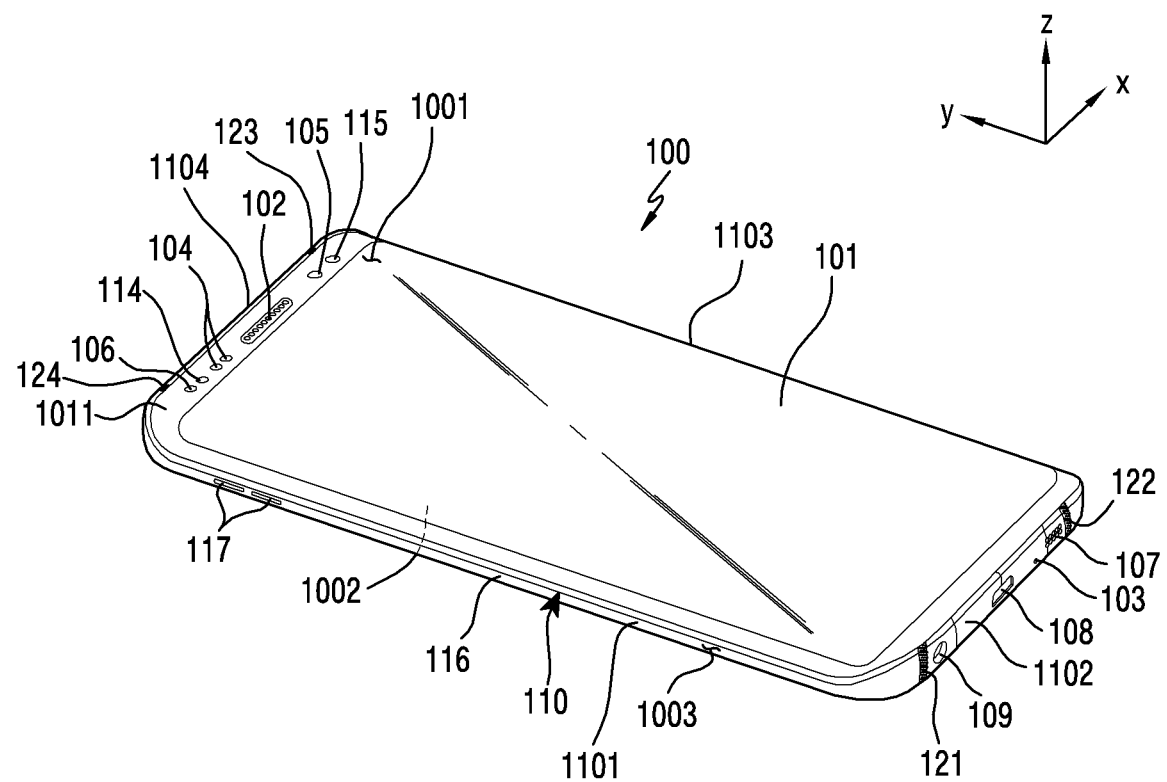
FIG. 1 is a perspective view illustrating a front surface of an example electronic device according to various embodiments.

Hereinafter, various example embodiments of the present disclosure will be described with reference to the accompanying drawings. It should be appreciated that various embodiments are not intended to limit the present disclosure to particular embodiments, and include various modifications, equivalents, and/or alternatives for the example embodiments of the present disclosure. With regard to the description of the drawings, similar reference numerals may be used to refer to similar or related elements.

An electronic device according to various embodiments of the present disclosure may include, for example, and without limitation, at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (for example, smart glasses, head-mounted-devices (HMDs), electronic apparels, electronic bracelets, electronic necklaces, electronic appcessories, electronic tattoos, smart mirrors, or smart watches), or the like.

In some example embodiments, the electronic device may, for example, and without limitation, be a smart home appliance, or the like. The smart home appliance may include, for example, and without limitation, at least one of a television (TV), a digital video disk (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, an electronic picture frame, or the like.

According to another example embodiment, the electronic device may include, for example, and without limitation, at least one of various medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), a navigation device, a global positioning system (GPS) receiver, an event data recorder (EDR), a flight data recorder (FDR), a vehicle infotainment device, electronic equipment for vessels (e.g., navigation systems and gyrocompasses), avionics, a security device, a head unit for vehicles, an industrial or home robot, an automatic teller's machine (ATM) of a finance institution, a point of sales (POS) of a store, internet of things (e.g., light bulbs, various sensors, electric or gas meters, sprinkler devices, fire alarms, thermostats, street lamps, toasters, exercise equipment, hot water tanks, heaters, boilers, and the like), or the like.

According to some example embodiments, the electronic device may include, for example, and without limitation, at least one of furniture, a portion of buildings/structures, an electronic board, an electronic signature receiving device, a projector, various measuring instruments (e.g., water meters, electricity meters, gas meters, or wave meters, and the like), or the like. In various example embodiments, the electronic device may be one or more combinations of the above-mentioned devices. According to various example embodiments, the electronic device may be a flexible electronic device. The electronic device according to various embodiments of the present disclosure is not limited to the above-mentioned devices, and may include new electronic devices according to technology development.

Hereinafter, various example embodiments of the present disclosure will be described with reference to the accompanying drawings.

Figure 2:
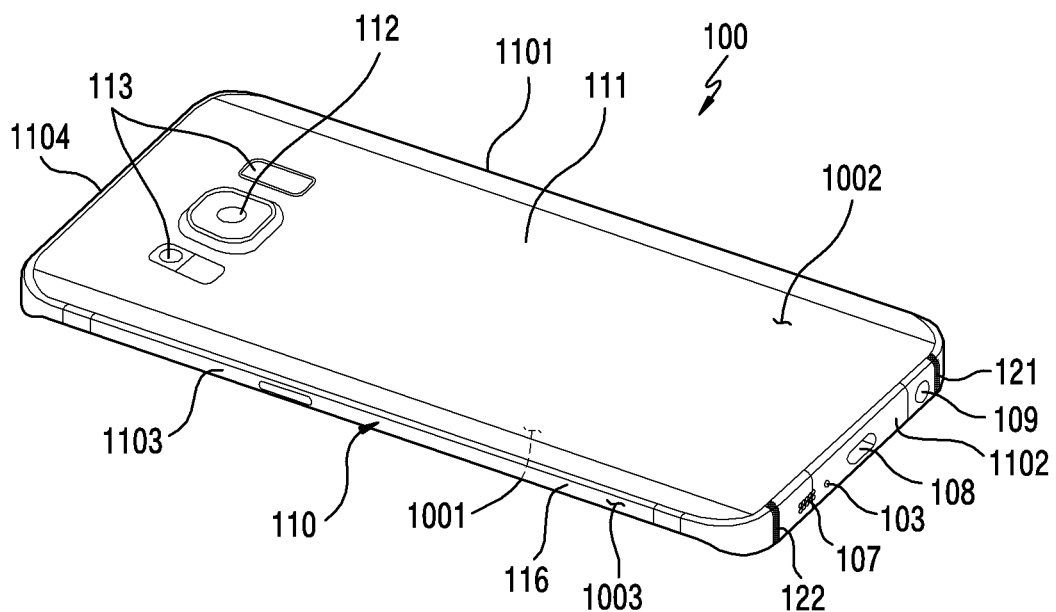
FIG. 2 is a perspective view illustrating a rear surface of the example electronic device according to various embodiments.

FIG. 1 is a perspective view illustrating a front surface of an example electronic device according to various embodiments. FIG. 2 is a perspective view illustrating a rear surface of the example electronic device according to various embodiments.

Referring to FIGS. 1 and 2, the electronic device 100 may include a housing 110. According to an embodiment, the housing 110 may be formed of a conductive member and/or a nonconductive member. According to an embodiment, the housing 110 may include a first surface 1001 (for example, a front surface or a top surface) facing a first direction (for example, a Z-axis direction), a second surface 1002 (for example, a rear surface or a bottom surface) disposed in a direction opposite to the first surface 1001, and a side surface 1003 disposed to surround at least part of the first surface 1001 and the second surface 1002. According to an embodiment, the side surface 1003 may be formed by a side surface member 116 which is coupled to a front surface plate 1011 (for example, a glass plate including various coating layers, or a polymer plate) and a rear surface plate 111, and may include, for example, metal and/or polymer. According to an embodiment, the rear surface plate 111 may be formed with, for example, and without limitation, coated or colored glass, ceramic, polymer, metal (for example, aluminum, stainless steel (STS), or magnesium), a combination of at least two of the aforementioned materials, or the like.

According to various embodiments, the side surface 1003 may be formed by the side surface member 116 (or a "side surface bezel structure") which is coupled with the front surface plate 1011 and the rear surface plate 111, and may include metal/and polymer. In some embodiments, the rear surface plate 111 and the side surface member 116 may be integrally formed with each other, and may include the same material (for example, a metallic material such as aluminum or magnesium). According to an embodiment, the side surface member 116 may include a first side surface 1101 having a first length, a second side surface 1002 extended in a perpendicular direction to the first side surface 1101 and having a second length, a third side surface 1103 extended from the second side surface 1102 in parallel with the first side surface 1101 to have the first length, and a fourth side surface 1104 extended from the third side surface 1103 in parallel with the second side surface 1102 to have the second length. According to an embodiment, the second side surface 1102 may have a unit conductive portion 1102 formed thereon and electrically isolated by one pair of nonconductive portions 121, 122 spaced apart from each other by a predetermined distance. In addition, the fourth side surface 1104 may have a conductive portion 1104 formed thereon and electrically isolated by one pair of nonconductive portions 123, 124 spaced apart from each other by a predetermined distance. The conductive portions 1102, 1104 which are electrically isolated may be electronically connected with a wireless communication circuit disposed inside the electronic device 100, thereby being utilized as an antenna operating in at least one resonant frequency band.

According to various embodiments, the electronic device 100 may include the front surface plate 1011 (for example, a window or glass plate) disposed on the first surface 1001, and a display 101 (for example, a touch screen display) disposed to be exposed through at least some region of the front surface plate 1011. According to an embodiment, the display 101 may be coupled to a touch sensing circuit, a pressure sensor capable of measuring an intensity of a touch (pressure), and/or a pen detection sensor (for example, a digitizer) for detecting a stylus pen of a magnetic field method, or may be disposed adjacent thereto.

According to various embodiments, the electronic device 100 may include a receiver hole 102 for communication. According to an embodiment, the electronic device 100 may use a speaker disposed therein, and may be controlled to allow a user to talk to the other person through the receiver hole 102 for communication. According to an embodiment, the electronic device 100 may include a microphone hole 103. According to an embodiment, the electronic device 100 may use at least one microphone disposed therein to detect a direction of a sound, and may receive an external sound or transmit a user's voice to the other person through the microphone hole 103.

According to various embodiments, the electronic device 100 may include at least one key input device 117. According to an embodiment, the key input device 117 may include at least one side key button 117 disposed on the side surface 1003 of the housing 110. According to an embodiment, the at least one side key button 117 may include a volume adjustment button, a wakeup button, or a specific function (for example, an artificial intelligence (AI) execution function or a quick voice recognition execution mode entering function, etc.) performing button.

According to various embodiments, the electronic device 100 may include components which are disposed to be exposed to the display 101 or to perform functions through the front surface plate 1011 but not to be exposed, and perform various functions of the electronic device 101. According to an embodiment, at least part of the components may be disposed to contact an external environment from the inside of the electronic device through at least some region of the front surface plate 1011 of a transparent material. According to an embodiment, the components may include at least one sensor module 104. The sensor module 104 may include, for example, an illuminance sensor (for example, a light sensor), a proximity sensor (for example, a light sensor), an infrared sensor, an ultrasonic sensor, a fingerprint recognition sensor, a face recognition sensor, or an iris recognition sensor. According to an embodiment, the components may include a first camera device 105. According to an embodiment, the components may include an indicator 106 (for example, a light emitting diode (LED) device) to visually provide state information of the electronic device 100 to the user. According to an embodiment, the components may include a light source 114 (for example, an infrared LED) disposed on one side of a receiver 102. According to an embodiment, the components may include an imaging sensor assembly 115 (for example, an iris camera) to detect an iris image in a state in which light generated from the light source 114 is radiated onto the periphery of user's eyes. According to an embodiment, at least one of the components may be disposed to be exposed through at least some region of the second surface 1002 (for example, the rear surface or bottom surface) facing in a direction (for example, a −Z-axis direction) opposite to the first direction of the electronic device 100.

According to various embodiments, the electronic device 100 may include an external speaker hole 107. According to an embodiment, the electronic device 100 may use a speaker disposed therein, and may emit a sound through the external speaker hole 107. According to an embodiment, the electronic device 100 may include a first connector hole 108 (for example, an interface connector port) to perform a data exchanging function with an external device and to receive external power and to charge the electronic device 100. According to an embodiment, the electronic device 100 may include a second connector hole 109 (for example, an ear jack assembly) to receive an ear jack of an external device.

According to various embodiments, the electronic device 100 may include the rear surface plate 111 (for example, a rear surface window) disposed on the second surface 1002. According to an embodiment, a rear facing camera device 112 may be disposed on the rear surface plate 111. At least one electronic component 113 may be disposed on the periphery of the rear facing camera device 112. According to an embodiment, the electronic component 113 may include at least one of an illuminance sensor (for example, a light sensor), a proximity sensor (for example, a light sensor), an infrared sensor, an ultrasonic sensor, a heartbeat sensor, a fingerprint recognition sensor, or a flash device.

According to various embodiments, the display 101 may include a touch panel and a display panel which are stacked on a rear surface of the front surface plate 1011. According to an embodiment, an image displayed through the display panel may be provided to the user through the front surface plate 1011 of the transparent material. According to an embodiment, the front surface plate 1011 may use various materials such as glass of a transparent material, or acryl, etc.

According to various embodiments, the electronic device 100 may include a waterproof structure. According to an embodiment, the electronic device 100 may include at least one waterproof member disposed therein, for waterproofing. According to an embodiment, the at least one waterproof member may be disposed between the display 101 and the side surface member 116 and/or between the side surface member 116 and the rear surface plate 111.

According to various embodiments, the conductive portion 1102 corresponding to the second side surface 1102 of the side surface member 116 may be used as an antenna operating in at least one resonant frequency band. According to an embodiment, the electronic device 100 may include a conductive plate (for example, a conductive plate 310 of FIG. 3) formed therein to be extended with the side surface member 116. According to an embodiment, the conductive plate (for example, the conductive plate 310 of FIG. 3) may have at least one functional slot (for example, a slot 312 of FIG. 3) formed thereon. For example, the slot (for example, the slot 312 of FIG. 3) may receive a swelling portion of a battery (for example, a battery 360 of FIG. 3) caused by a swelling phenomenon of the battery, or may be applied as a receiving space of a removable electronic pen (for example, a stylus pen). According to an embodiment, the electronic device 100 may include a conductor contributing as an inner electronic component. The conductor may unintentionally correspond to the above-described conductive portion 1102, and an image current flow generated in the conductive plate (for example, the conductive plate 310 of FIG. 3) may be hindered by the slot (for example, the slot 312 of FIG. 3), thereby causing a parasitic resonance. According to an embodiment, the conductor may include a flexible printed circuit board (FPCB) having a display driver IC (DDI) mounted therein. Herein, the DDI may be folded toward the rear surface of the display 101 and disposed to face the conductive plate (for example, the conductive plate 310 of FIG. 3). According to an embodiment, radiation performance of the conductive portion 1102 may be degraded by the parasitic resonance, or the resonant frequency band may be shifted to an undesired band. In exemplary embodiments of the present disclosure, to prevent this phenomenon, the parasitic resonance frequency may be induced to operate in a specific band by adjusting an electric length of the slot (for example, the slot 312 of FIG. 3) using a conductive member (for example, a conductive member 313 of FIG. 3), and thus degradation of the radiation performance of the above-described conductive portion 1102 can be prevented and/or reduced.

Figure 3:
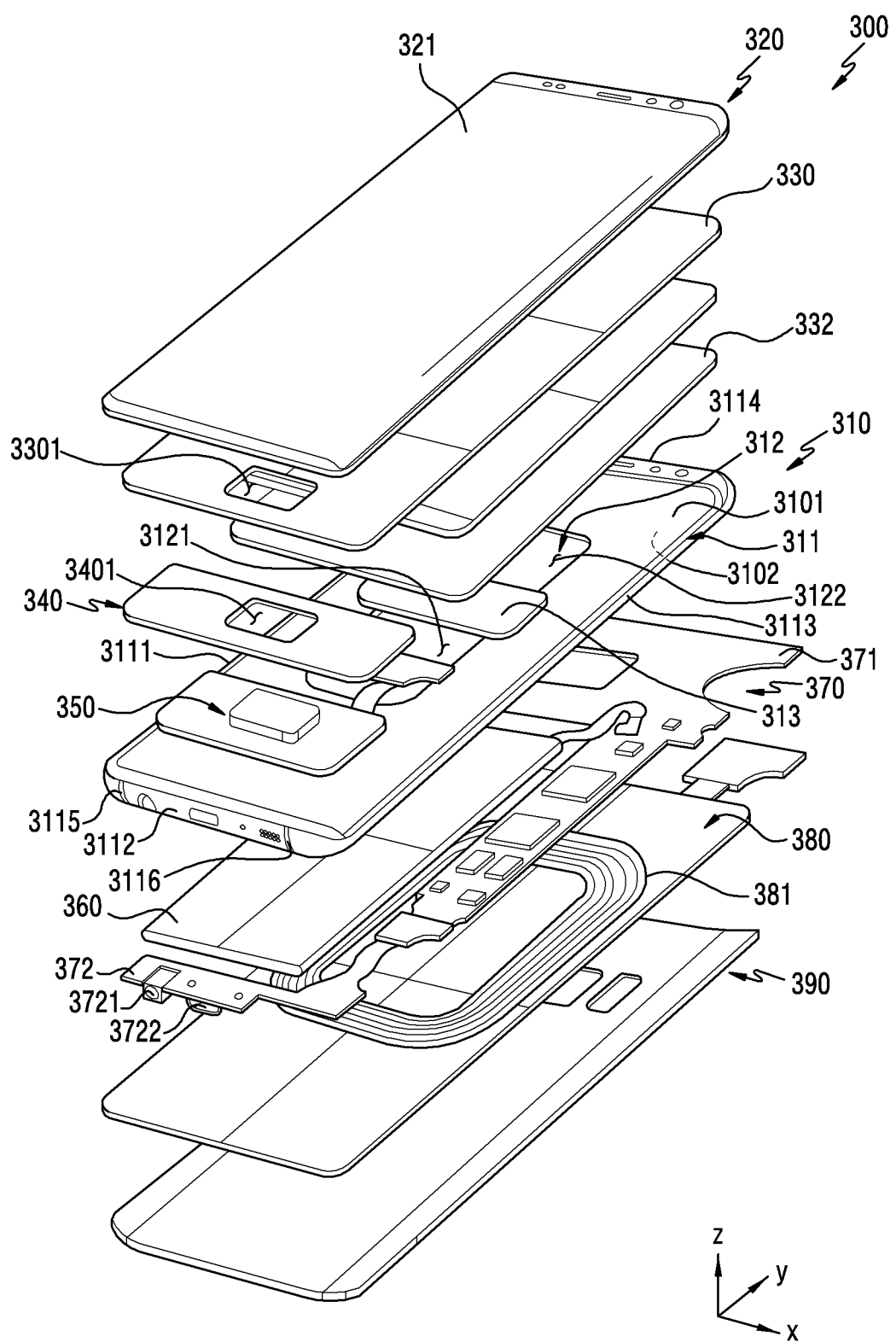
FIG. 3 is an exploded perspective view illustrating an interior of an example electronic device according to various embodiments.

FIG. 3 is an exploded perspective view illustrating an interior of an example electronic device according to various embodiments of the present disclosure.

The electronic device 300 of FIG. 3 may be similar to the electronic device 100 of FIGS. 1 and 2 at least in part, or may include other embodiments of the electronic device.

Referring to FIG. 3, the electronic device 300 may include a housing (for example, the housing 210 of FIG. 1). According to an embodiment, the housing (for example, the housing 210 of FIG. 1) may include a front surface plate 320 (for example, the front surface plate 1011 of FIG. 1) including a display 321 (for example, a touch screen display) (for example, the display 101 of FIG. 1) disposed on a first surface (for example, the first surface 1001 of FIG. 1) facing a first direction (for example, the Z-axis direction), a rear surface plate 390 (for example, the rear surface plate 111 of FIG. 1) disposed on a second surface (for example, the second surface 1002 of FIG. 2) opposite to the first surface, and a conductive middle plate 310 (hereinafter, referred to as a "conductive plate") disposed between the front surface plate 320 and the rear surface plate 390. According to an embodiment, the conductive plate 310 may include a first surface 3101 facing the first direction (for example, the Z-axis direction), a second surface 3102 facing in a direction (for example, -Z-axis direction) opposite to the first surface 3101, and a side surface member 311 surrounding the first surface 3101 and the second surface 3102.

According to various embodiments, the side surface member 311 may include a first side surface 3111 having a first length, a second side surface 3112 extended in a perpendicular direction to the first side surface 3111 and having a second length, a third side surface 3113 extended from the second side surface 3112 in parallel with the first side surface 3111 to have the first length, and a fourth side surface 3114 extended from the third side surface 3113 in parallel with the second side surface 3112 to have the second length. According to an embodiment, the second side surface 3112 may have a unit conductive portion 3112 formed thereon and electrically isolated by one pair of nonconductive portions 3115, 3116 (cut-off portions) spaced apart from each other by a predetermined distance. The conductive portion 3112 electrically isolated as described above may be electrically connected with a wireless communication circuit disposed inside the electronic device 300, thereby being utilized as an antenna operating in at least one resonant frequency band.

According to various embodiments, the electronic device 300 may include a fingerprint recognition sensor 350, a pressure sensor 340, and an electro magnetic resonance (EMR) sensor pad 330 which are disposed between the first surface 3101 of the conductive plate 310 and the display 321 exposed through at least some region of the front surface plate 320. According to an embodiment, the electronic device 300 may include a conductive film 330 (for example, a CU sheet) and a dielectric film 332 (for example, a double-sided tape) which are disposed between the first surface 3101 of the conductive plate 310, and the display 321. According to an embodiment, the electronic device 300 may include a battery 360, at least one printed circuit board (PCB) 370, a wireless power receiving member 380, and the rear surface plate 390 which are disposed on the second surface 3102 of the conductive plate 310.

According to various embodiments, the fingerprint recognition sensor 350 may receive reflected light using a light source of the display 321 when a fingerprint contacts. According to an embodiment, the fingerprint recognition sensor 350 may receive reflected light using a separate light source. According to an embodiment, the fingerprint recognition sensor 350 may operate in a capacitance method (for example, an active capacitance method or passive capacitance method), an ultrasonic method, or an optical method.

According to various embodiments, the pressure sensor 340 may operate in a capacitive method, and may detect a change in a gap between two electrode layers spaced by a dielectric, which is caused by pressure. According to an embodiment, the capacitive method may include a self-capacitance method or a mutual capacitance method.

According to various embodiments, the EMR sensor pad 330 may be disposed to detect an electronic pen applied as a data inputting means. According to an embodiment, the EMR sensor pad 330 may operate in an electromagnetic induction method to receive a feedback signal generated by a resonant frequency of a coil body provided in the electronic pen. According to an embodiment, the fingerprint recognition sensor 350 may be disposed to overlap at least some region of the pressure sensor 340 and the EMR sensor pad 330, and in this case, at least a portion of the fingerprint recognition sensor 350 may be disposed to contact the rear surface of the display 321 through openings 3401, 3301 disposed on corresponding positions of the pressure sensor 340 and the EMR sensor pad 330.

According to various embodiments, the battery 360 may have at least a portion thereof received in the slot 312 formed on at least some region of the conductive plate 310, and may be disposed to avoid at least one PCB 370. According to an embodiment, the slot 312 may be formed to have a size enough to receive a swelling portion of the battery caused by the swelling phenomenon of the battery. According to an embodiment, the battery 360 and the at least one PCB 370 may be disposed in parallel without overlapping each other. However, this should not be considered as limiting, and the battery 360 may be disposed to overlap the at least one PCB 370 at least in part.

According to various embodiments, the at least one PCB 370 may include a main PCB 371 and a sub PCB 372 which is electrically connected with the main PCB 371. According to an embodiment, the sub PCB 372 may be electrically connected with the main PCB 371 by an electric connection member (for example, a session cable, an FPCB, or the like). According to an embodiment, the conductive portion 3112 may be electrically connected with the sub PCB 372, and may be electrically connected with the wireless communication circuit mounted in the sub PCB 372 or the main PCB 371. According to an embodiment, the sub PCB 372 may include a first connector hole 3722 (for example, an interface connector port) and a second connector hole 3721 (for example, an ear jack assembly) which are electrically connected with each other.

According to various embodiments, at least one waterproof member (sealing member) may be disposed between the rear surface plate 390 and the conductive plate 310, and/or between the conductive plate 310 and the front surface plate 320 and/or the display 321. According to an embodiment, the waterproof member may include at least one of a tape, an adhesive, waterproof dispensing, silicon, waterproof rubber, and urethane.

According to various embodiments, the electronic device 300 may include a conductor contributing as an inner electronic component, and the conductor may unintentionally correspond to the conductive portion 3112, and an image current flow generated in the conductive plate 310 may be hindered by the slot 312, thereby causing a parasitic resonance. According to an embodiment, the conductor 322 may include an FPCB having a DDI mounted therein, and the DDI may be folded toward the rear surface of the display 321 and disposed to face the conductive plate 310. According to an embodiment, an image current induced in the conductive plate 310 may be induced to the slot through the conductor, and radiation performance of the conductive portion 3112 may be degraded by the parasitic resonance caused by the image current, or the resonant frequency band may be shifted to an undesired band.

According to various embodiments, the electronic device 300 may include a conductive member 313 disposed to cross over the slot 312 of the conductive plate 310. According to an embodiment, the conductive member 313 may be disposed between the conductive plate 310 and the front surface plate 320, and may be disposed by being attached to the first surface 3101 of the conductive plate 310. According to an embodiment, the conductive member 313 may be formed with a metallic material (for example, Cu) in the form of a metal patch. According to an embodiment, the slot 312 having a length may be divided into two sub slots 3121, 3122 by the conductive member 313 crossing over the slot, and the image current induced to the slot through the conductor 322 may appear as a resonant frequency of a specific band through respective electric lengths of the two sub slots 3121, 3122. The parasitic resonance frequency operating in such a specific band may be induced to operate out of a range of the resonant frequency band of the conductive portion 3112 by the conductive member 313. Accordingly, the conductive portion 3112 of the side surface member 311 avoids an interference by the undesired parasitic resonance formed by the conductor 322 and the slot 312, such that degradation of the radiation performance can be prevented and/or reduced.

Figure 4:
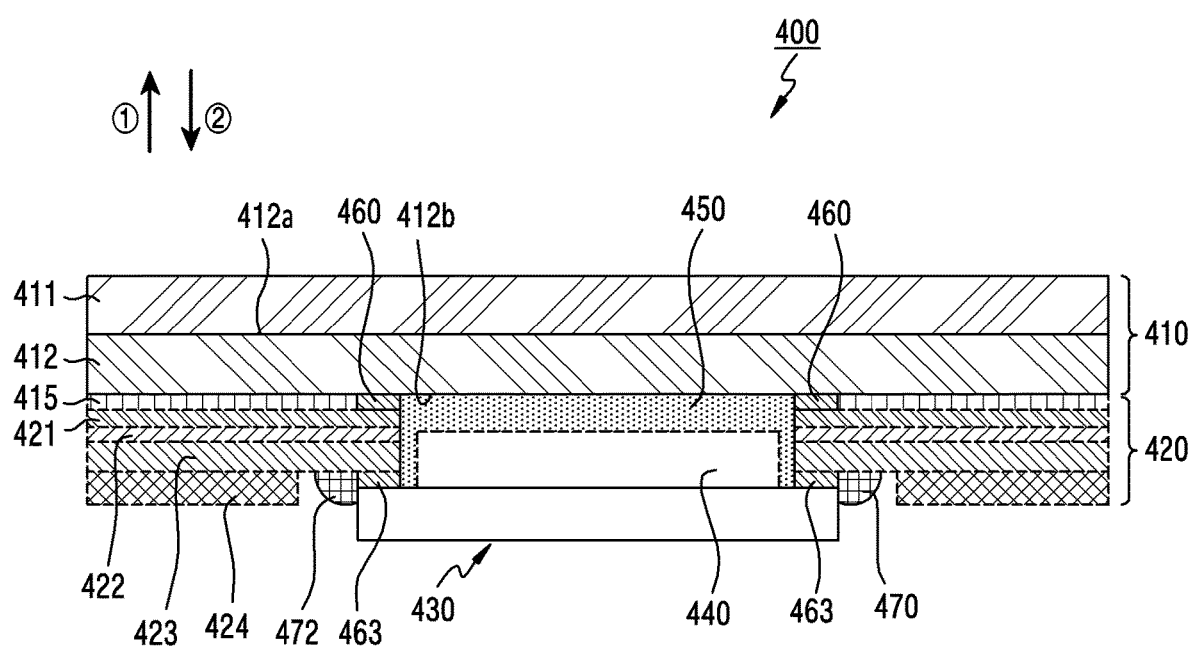
FIGS. 4, 5, 6, 7, 8 and 9 are cross-sectional views illustrating an example configuration of a display according to various embodiments of the present disclosure.

FIG. 4 is a cross-sectional view illustrating an example configuration of a display according to various embodiments of the present disclosure.

Referring to FIG. 4, the display 400 included in the electronic device according to various embodiments may be configured the same as or similar to the display 101 or 330 disposed on the front surface of the electronic device illustrated in FIGS. 1, 3 and 3. The display 400 according to various embodiments may include a rear surface panel 420, a biological sensor 430, a filler 450, a sealing member (seal) 460 (for example, a stopper), and an opening. The rear surface panel 420 may be formed under a display panel unit 410 of the display 400, or may not be formed under the display panel unit 410.

The display panel unit 410 according to various embodiments may include a transparent member 411 and a display panel 412. The transparent member 411 is an exterior member disposed on the display panel 412 of the electronic device, and may be referred to as, for example, a window, a front surface window, a transparent substrate, or the like. The transparent member 411 may be formed with a tempered glass material, or a transparent synthesis resin having the same hardness as that of a glass material.

The display panel 412 according to various embodiments may be configured as a structure coupled with a touch sensing circuit, a pressure sensor capable of measuring an intensity (pressure) of a touch, and/or a digitizer for detecting a stylus pen of a magnetic field method. For example, the display panel 412 may be formed to be planar or curved, or in combination of a flat surface or a curved surface. The display panel 412 may be formed with a rigid material or a flexible material.

The display panel 412 according to various embodiments may include a first surface 412a facing a first direction and a second surface 412b facing a second direction opposite the first direction. The transparent member 411 may be disposed on the first surface 412a of the display panel, and an adhesion layer may be positioned on the second surface 412b of the display panel.

The rear surface panel 420 according to various embodiments may refer, for example, to a panel that is attached to a lower portion of the display panel 412 by an adhesion layer 415, and may include a black coating layer 421 and a shock absorption member 422. The rear surface panel 420 may further include a digitizer 423 or may not include the digitizer. In addition, the digitizer 423 may be disposed under the shock absorption member 422 or may not be disposed under the shock absorption member 422.

The shock absorption member 422 according to various embodiments may be disposed under the blacking coating layer 421 to absorb a shock, etc. applied to the electronic device, and to prevent and/or reduce the shock from being transmitted to the display panel 412. For example, the shock absorption member 422 may be disposed between the black coating layer 421 and the digitizer 423 in the form of a layer, and may include a cushion or the like formed with a foaming resin material. The rear surface panel 420 may not be configured in the display 400 or the digitizer 423 may be replaced with a pressure sensor or a touch sensitive panel.

The display 400 according to various embodiments may have an opening formed on at least some region under the display panel 412. The opening may be a component mounting space, and may be formed by cutting a portion of the rear surface panel 420 disposed under the display panel 412. The cut portion of the rear surface panel 420 may be a portion of the adhesion layer 415, a portion of the black coating layer 421, a portion of the shock absorption member 422, and/or a portion of the digitizer 423, and these portions may be cut and removed. The biological sensor 430 may be disposed in the opening, and the opening may be a mounting space filled with the filler 450. The opening may be formed in a substantially cuboidal shape, but is not limited thereto.

The biological sensor 430 according to various embodiments may be mounted in the opening, and may be disposed in a sealed state using at least one sealing member (seal) 460, 463. For example, the biological sensor 430 may, for example, and without limitation, be an ultrasonic sensor, or the like, and may be utilized, for example, and without limitation, as a fingerprint sensor, an image sensor, or the like. The biological sensor 430 may be disposed to face the display panel 412, and may be disposed in parallel with (to face) the second surface 412b of the display panel. For example, the biological sensor 430 may be disposed to be completely received in the opening, or may have at least a portion thereof disposed in the opening.

The filler 450 according to various embodiments may be a material filling at least some space of the opening between the display panel 412 and the biological sensor 430. The filler 450 may be disposed on a sensing path of the biological sensor 430, and may be formed in the form of a layer. For example, the filler 450 may be formed with a material which is not naturally cured at natural temperature, may be formed with a material which does not substantially change a material characteristic or a volume even at high temperature or low temperature, or may be formed with a material having a material property of a high viscosity. For example, the filler 450 may be formed with, for example, and without limitation, at least one material of gel, epoxy, or the like.

The filler 450 according to various embodiments may have an acoustic impedance value, the acoustic impedance value of the filler 450 may be adjustable, and the filler 450 may be formed to be able to match with other materials. The filler 450 may be filled in the opening existing on the sensing path of the biological sensor 430 through an injection inlet that may be provided, for example in a seal. The injection inlet of the filler 450 and a discharge outlet will be described in greater detail below with reference to FIG. 12. The filler 450 may also perform a role of an adhesion layer to attach the biological sensor 430 to the second surface 412b of the display panel 412 in a biological sensor mounting structure.

According to various embodiments, an acoustic transmission coefficient (impedance) of the filler 450 may be equal to an acoustic transmission coefficient of the display panel 412, and an acoustic transmission coefficient of the biological sensor 430, for example, an ultrasonic sensor, or may have a value therebetween.

The sealing member (seal) 460, 463 according to various embodiments may completely seal a space filled with the filler 450 in the opening between the biological sensor 430 and the display panel 412. The number of the sealing member (seal) 460, 463 may be at least one, and the sealing member may be disposed mainly to seal some space of the opening filled with the filler 450. A crack or gap may be formed between the second surface 412b of the display panel and the black coating layer 421. One sealing member 460 may be disposed in the crack formed by the second surface 412b of the display panel, the black coating layer 421, and the adhesion layer 415. A crack may be formed between the biological sensor 430 and the digitizer 423. Accordingly, another sealing member 463 may be disposed in the crack or gap formed between the biological sensor 430 and the digitizer 423. Finally, after the filler 450 is filled, the injection inlet of the filler and the discharge outlet of air may be closed by sealing portions 470, 472, respectively.

The biological sensor 430 according to various embodiments may further include an acoustic lens 440 or may not include the acoustic lens. The acoustic lens 440 may be disposed on the biological sensor 430 to face the display panel 412. The acoustic lens 440 may be provided on the biological sensor 430 to perform an acoustic guide function and thus to contribute to enhancement of the performance of the biological sensor 430, for example, the ultrasonic sensor.

According to various embodiments, the display 400 may, for example, and without limitation, be manufactured in order of the following processes of: attaching the rear surface panel 420 having the opening formed therein to the display panel 412; arranging the biological sensor 430 in the opening and then forming a sealing structure; injecting the filler 450 into the space between the biological sensor 430 and the display panel 412; and closing the injection inlet and the discharge outlet. A shielding sheet 424 may be a copper sheet or a copper plate of a copper material. The shielding sheet 424 may be a support structure supporting the digitizer 423, and may have a radiating function of the display panel 412. The shielding sheet 424 may not be formed on the rear surface panel 420.

Figure 5:
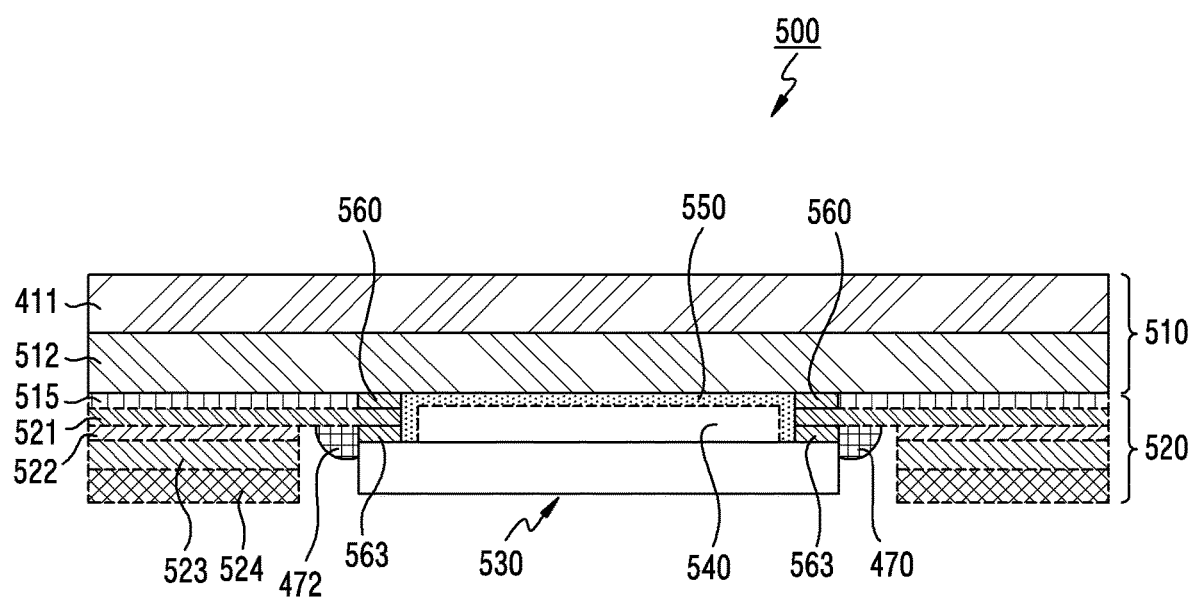

FIG. 5 is a cross-sectional view illustrating an example configuration of a display according to various embodiments of the present disclosure.

Referring to FIG. 5, the display 500 included in the electronic device according to various embodiments may be configured the same as or similar to the display 101 or 330 disposed on the front surface of the electronic device illustrated in FIGS. 1, 2 and 3. Comparing the display 500 according to various embodiments and the display 400 shown in FIG. 4, the description of similar elements may not be described in detail, and a difference therebetween will be described. Compared with the structure of the display 400 illustrated in FIG. 4, the structure of the display 500 illustrated in FIG. 5 differs therefrom in a mounting structure of a biological sensor 530, and the other elements are the same or similar and thus a detailed description thereof will not be repeated here. In the mounting structure of the biological sensor 430 illustrated in FIG. 4, a portion of the biological sensor is received in the opening and another portion protrudes. However, in the mounting structure of the biological sensor 530 illustrated in FIG. 5, the biological sensor 530 may be substantially completely received and sealed in an opening.

The biological sensor 530 according to various embodiments may further include an acoustic lens 540 or may not include the acoustic lens. The acoustic lens 540 may be disposed on the biological sensor 530 to face the display panel 512. The acoustic lens 540 may be provided on the biological sensor 530 to perform an acoustic guide function and thus to contribute to enhancement of the performance of the biological sensor 530, for example, the ultrasonic sensor.

The display 500 according to various embodiments may include a display panel unit 510 (for example, the display panel unit 410 of FIG. 4), a rear surface panel 520 (for example, the rear surface panel 420 of FIG. 4), the biological sensor 530 (for example, the biological sensor 430 of FIG. 4), a filler 550 (for example, the filler 450 of FIG. 4), a sealing member 560, 563 (for example, the sealing member 460, 463 of FIG. 4), and the opening. The opening according to various embodiments may be formed by cutting a portion of the rear surface panel 520 disposed under a display panel 512. The cut portion of the rear surface panel 520 may be a portion of an adhesion layer 515 (for example, the adhesion layer 415 of FIG. 4), a portion of a black coating layer 521 (for example, the black coating layer 421 of FIG. 4), a portion of a shock absorption member 522 (for example, the shock absorption member 422 of FIG. 4), and a portion of a copper sheet 524 (for example, the shielding sheet 424 of FIG. 4) and a digitizer 523 (for example, the digitizer 423 of FIG. 4), and these portions may be cut and removed. The biological sensor 530 may be disposed in the opening, and the opening may be a mounting space filled with the filler 550. The opening may be formed in a substantially cuboidal shape, but is not limited thereto.

Figure 12:
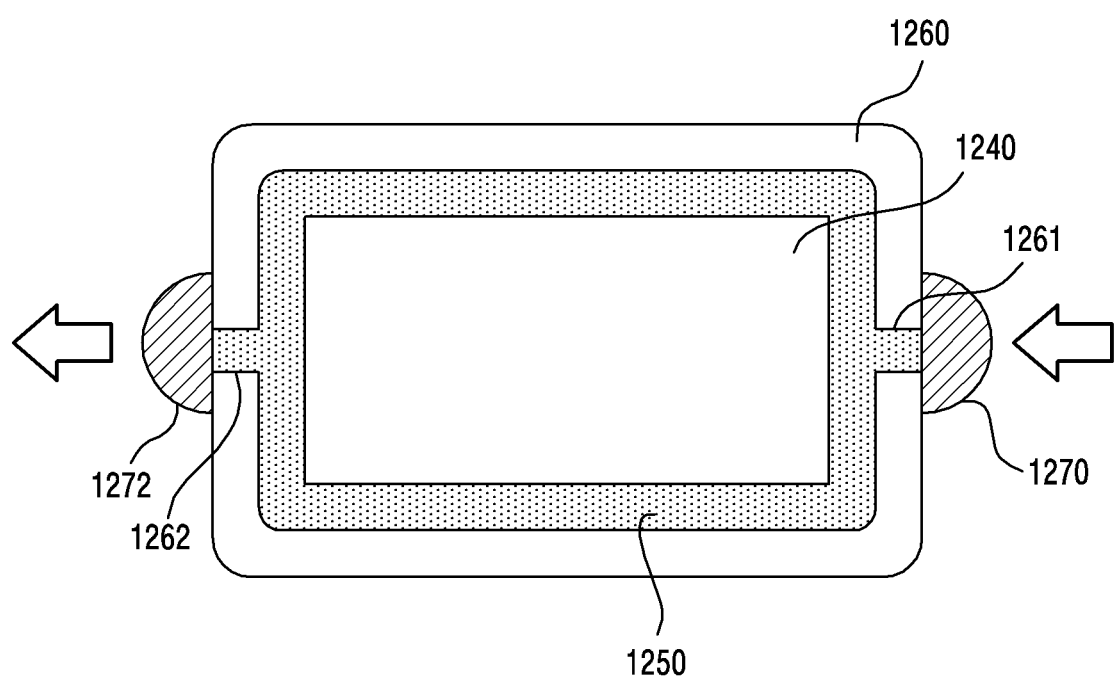
FIG. 12 is a top view illustrating an example of a filler injection inlet and an outlet according to various embodiments of the present disclosure.
Figure 13:
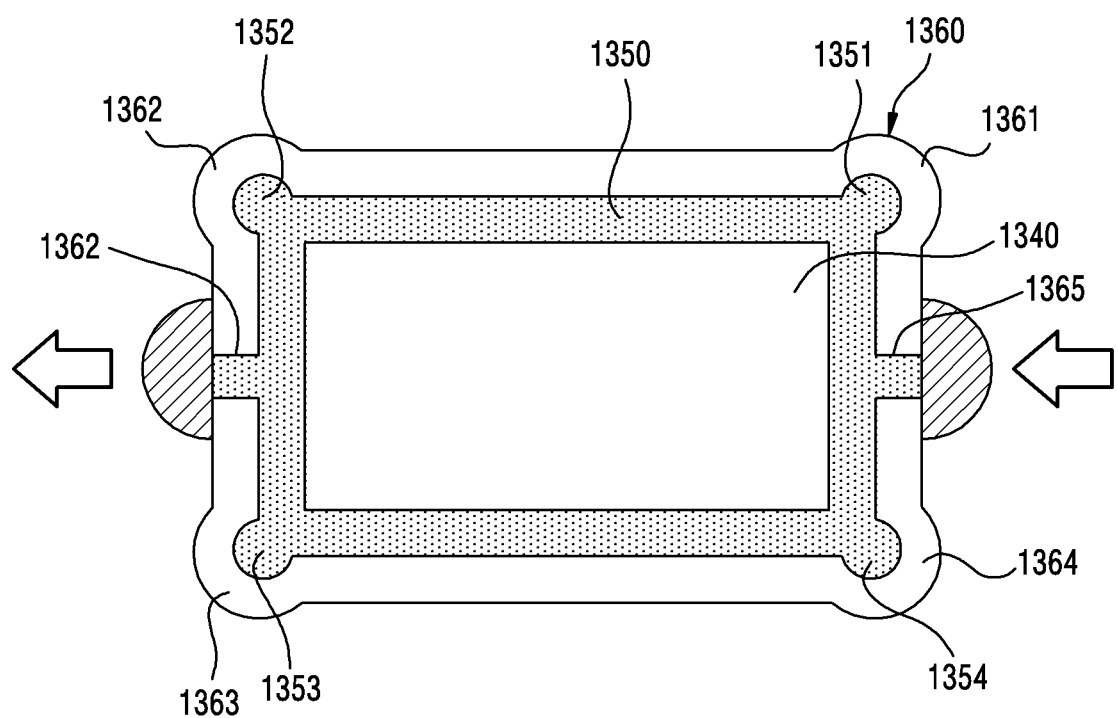
FIG. 13 is a top view illustrating another example of a filler injection inlet and an outlet according to various embodiments of the present disclosure.

The sealing member (seal) 560, 563 according to various embodiments may completely seal at least some space (for example, except for the injection inlet and the discharge outlet shown in FIGS. 12 and 13) filled with the filler 550 in the opening between the biological sensor 530 and the display panel 512. The number of the sealing member 560, 563 may be at least one, and the sealing member 560, 563 may be disposed to seal some space of the opening filled with the filler 550. One sealing member 560 may be disposed on at least a portion of the opening surrounded by the second surface 512b of the display panel, the black coating layer 521, and the adhesion layer 515. In addition, the other sealing member 563 may be disposed in a crack or gap between the biological sensor 530 and the black coating layer 521. The two sealing members 560, 563 may overlap one on the other.

Figure 6:
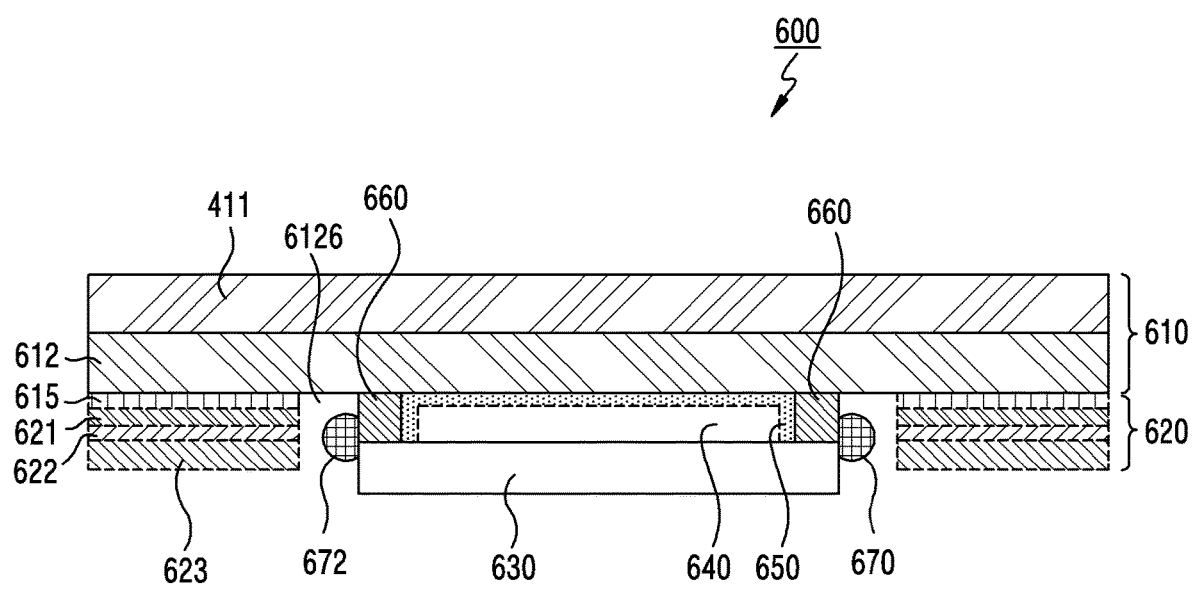

FIG. 6 is a cross-sectional view illustrating an example configuration of a display according to various embodiments of the present disclosure.

Referring to FIG. 6, the display 600 included in the electronic device according to various embodiments may be configured the same as or similar to the display 101 or 330 disposed on the front surface of the electronic device illustrated in FIGS. 1, 2 and 3. Comparing the display 600 according to various embodiments and the display 400 shown in FIG. 4, the same elements may not be described in detail, and a difference therebetween will be described. Compared with the structure of the display 400 illustrated in FIG. 4, the structure of the display 600 illustrated in FIG. 6 differs therefrom in a mounting structure of a biological sensor 630, and the other elements are the same or similar, and thus a detailed description thereof may not be repeated here.

The display 600 according to various embodiments may include a display panel unit 610 (for example, the display panel unit 410 of FIG. 4), a rear surface panel 620 (for example, the rear surface panel 420 of FIG. 4), the biological sensor 630 (for example, the biological sensor 430 of FIG. 4), a filler 650 (for example, the filler 450 of FIG. 4), a sealing member 660 (for example, the sealing member 460, 463 of FIG. 4), and an opening. The rear surface panel 620 may be disposed under the display panel 610 or may not be disposed.

The biological sensor 630 according to various embodiments may further include an acoustic lens 640 or may not include the acoustic lens. The acoustic lens 640 may be disposed on the biological sensor 630 to face the display panel 612. The acoustic lens 640 may be provided on the biological sensor 630 to perform an acoustic guide function and thus to contribute to enhancement of the performance of the biological sensor 630, for example, the ultrasonic sensor.

The opening according to various embodiments may be formed by cutting a portion of the rear surface panel 620 disposed under a display panel 612. The cut portion of the rear surface panel 620 may be a portion of an adhesion layer 615, a portion of a black coating layer 621, a portion of a shock absorption member 622, and a portion of a digitizer 623, and these portions may be cut and removed. The biological sensor 630 may be disposed in at least some region of the opening, and the opening may be a mounting space filled with the filler 650. The opening may be formed in a substantially cuboidal shape, but is not limited thereto.

The sealing member (seal) 660 according to various embodiments may be a member which substantially completely seals a space (for example, except for the injection inlet and the discharge outlet shown in FIGS. 12 and 13) filled with the filler 650 in at least some space of the opening between the biological sensor 630 and the display panel 612. One sealing member 660 may be disposed in a crack or gap between the second surface 612b of the display panel and the biological sensor 630 to seal a space existing on the sensing path of the biological sensor. Portions where an injection inlet and a discharge outlet are formed may be closed by first and second sealing members 670, 672, respectively. The first sealing member 670 may seal and close to sufficiently cover the injection inlet (for example, an injection inlet 1261 of FIG. 12) formed between one side portion of the biological sensor 630 and the sealing member 660 on one side, and the second sealing member 672 may seal and close to sufficiently cover the discharge outlet (for example, a discharge outlet 1262 of FIG. 12) formed between the other side portion of the biological sensor 630 and the sealing member 660 on the other side.

Figure 7:
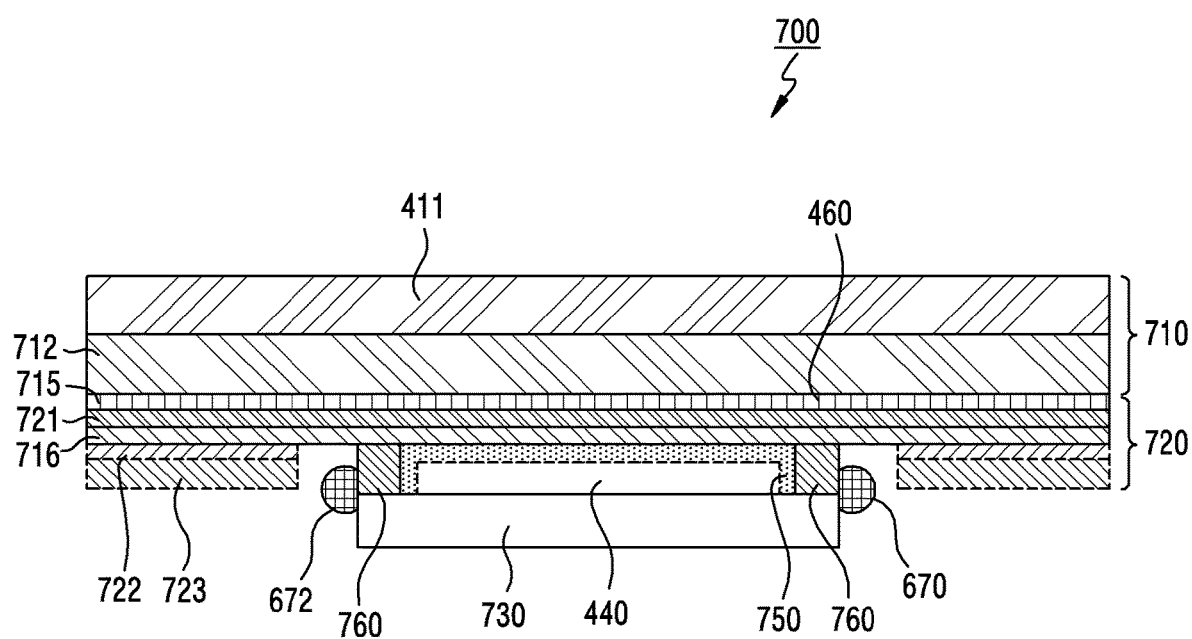

FIG. 7 is a cross-sectional view illustrating an example configuration of a display according to various embodiments of the present disclosure.

Referring to FIG. 7, the display 700 included in the electronic device according to various embodiments may be configured the same as or similar to the display 101 or 330 disposed on the front surface of the electronic device illustrated in FIGS. 1, 2 and 3. Comparing the display 700 according to various embodiments and the display 400 shown in FIG. 4, the same elements may not be described in detail, and a difference therebetween will be described. Compared with the structure of the display 400 illustrated in FIG. 4, the structure of the display 700 illustrated in FIG. 7 differs therefrom in a mounting structure of a biological sensor 730, and the other elements are the same or similar and thus a detailed description thereof may not be repeated here.

The display 700 according to various embodiments may include a display panel unit 710 (for example, the display panel unit 410 of FIG. 4), a rear surface panel 720 (for example, the rear surface panel 420 of FIG. 4), the biological sensor 730 (for example, the biological sensor 430 of FIG. 4), a filler 750 (for example, the filler 450 of FIG. 4), a sealing member 760 (for example, the sealing member 460 of FIG. 4), and an opening.

The rear surface panel 720 according to various embodiments may include first and second adhesion layers 715, 716, a black coating layer 721, a shock absorption member 722, and a digitizer 723. The rear surface panel 720 may not include the digitizer 723. The first adhesion layer 715 may attach the black coating layer 721 to a bottom surface of the display panel 712, and the second adhesion layer 716 may attach the shock absorption member 722 and the digitizer 723 to a bottom surface of the blacking coating layer 721.

The opening according to various embodiments may be formed by cutting a portion of the rear surface panel 720 disposed under a display panel 712. The cut portion of the rear surface panel 720 may be a portion of the shock absorption member 722, and a portion of the digitizer 723, and these portions may be cut and removed. The biological sensor 730 may be disposed in at least some region of the opening, and the opening may be a mounting space filled with the filler 750. The opening may be formed in a substantially cuboidal shape, but is not limited thereto.

The sealing member 760 according to various embodiments may be a member which completely seals a space filled with the filler 750 (for example, except for the injection inlet and the discharge outlet shown in FIGS. 12 and 13) in the opening between the biological sensor 730 and the display panel 712. The sealing member 760 according to various embodiments may be disposed in a crack or gap between the second adhesion layer 716 and the biological sensor 730 to seal a portion of the space existing on the sensing path of the biological sensor 730.

Figure 8:
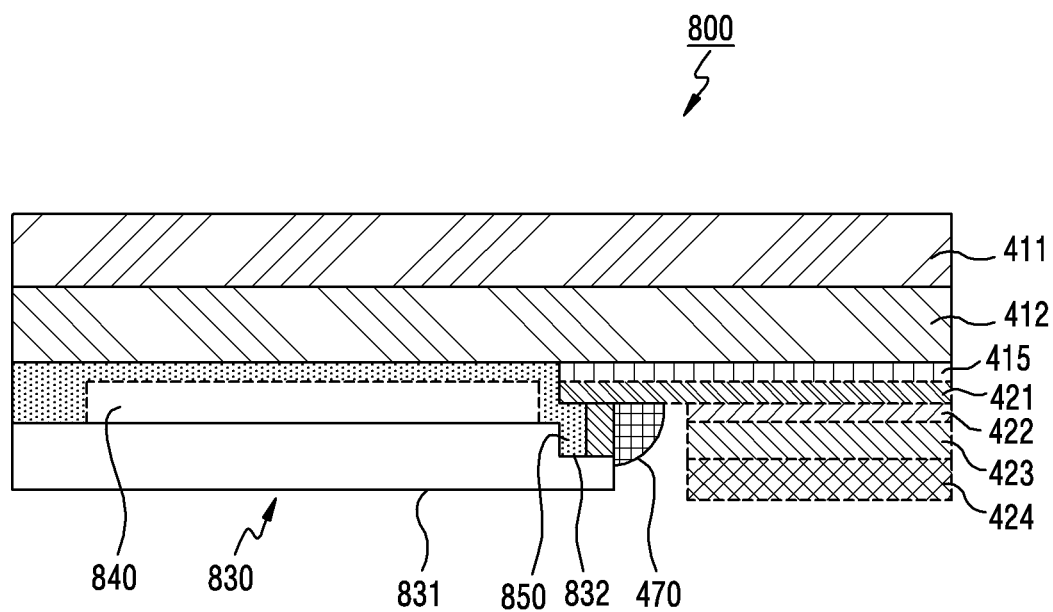

FIG. 8 is a cross-sectional view illustrating an example configuration of a display according to various embodiments of the present disclosure.

Referring to FIG. 8, the display 800 employed in the electronic device according to various embodiments may be configured the same as or similar to the display 101 or 330 disposed on the front surface of the electronic device illustrated in FIGS. 1, 2 and 3. Comparing the display 800 according to various embodiments and the display 400 shown in FIG. 4, the same elements may not be described in detail, and a difference therebetween will be described. Compared with the structure of the display 400 illustrated in FIG. 4, the structure of the display 800 illustrated in FIG. 8 differs therefrom in structures of an injection inlet of a filler and a discharge outlet, and the other elements are the same or similar and thus a detailed description thereof may not be repeated here. Although FIG. 4 or FIGS. 12 and 13 depict that the injection inlet of the filler is formed on at least a portion of the sealing member, this is not limited, and the injection inlet of the filler may be formed on a biological sensor 830.

The biological sensor 830 (for example, the biological sensor 430 of FIG. 4) according to various embodiments may include a sensor housing 831, an acoustic lens 840 (for example, the acoustic lens 440 of FIG. 4), and a stepped portion (recess) 832. The sensor housing 831 may be a portion forming an exterior of the biological sensor 830, and may be formed in a substantially cuboidal shape.

The sensor housing 831 according to various embodiments may have the stepped portion 832 formed on one end thereof to form an injection inlet of a filler 850. Although not shown, a stepped portion may be formed on the other end of the sensor housing 831 to form a discharge outlet of air. The stepped portion 832 may be formed by processing the sensor housing 831. The injection inlet is formed on the stepped portion 832 of the biological sensor 830, such that the filler can be more easily filled through the injection inlet.

Figure 9:
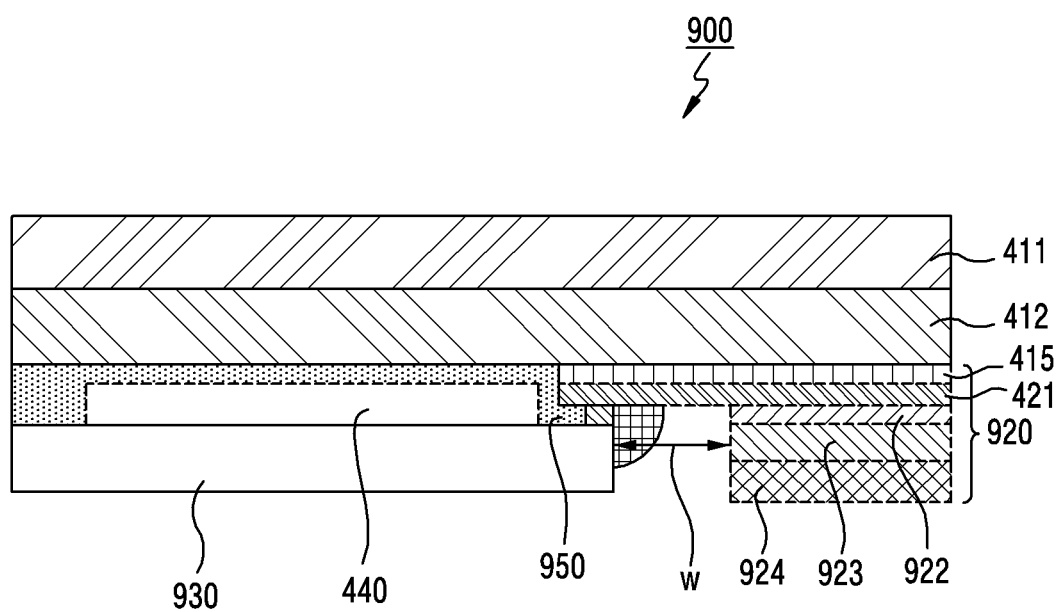

FIG. 9 is a cross-sectional view illustrating an example configuration of a display according to various embodiments of the present disclosure.

Referring to FIG. 9, the display 900 employed in the electronic device according to various embodiments may be configured the same as or similar to the display 101 disposed on the front surface of the electronic device illustrated in FIGS. 1, 2 and 3. Comparing the display 900 according to various embodiments and the display 400 shown in FIG. 4, the same elements may not be described in detail, and a difference therebetween will be described. Compared with the structure of the display 400 illustrated in FIG. 4, the structure of the display 900 illustrated in FIG. 8 differs therefrom in structures of an injection inlet of a filler and a discharge outlet, and the other elements are the same or similar and thus a detailed description thereof may not be repeated here. Although FIG. 4 or FIGS. 12 and 13 depict that the injection inlet of the filler is formed on at least a portion of the sealing member, this is not limited, and the injection inlet of the filler may be formed on a biological sensor 930.

According to various embodiments, the display 900 may be configured by further cutting a portion of a rear surface panel 920 (for example, the rear surface panel 420 of FIG. 4) to allow the filler 950 (for example, the filler 450 of FIG. 4) to be easily injected through the injection inlet. For example, the rear surface panel 920 may be formed by additionally cutting a portion of a shock absorption member 922 (for example, the shock absorption member 422 of FIG. 4), a portion of a digitizer 923 (for example, the digitizer 423 of FIG. 4), and a portion of a shielding sheet 924 (for example, the shielding sheet 424 of FIG. 4), and thereby may allow easy injection through the injection inlet. A width w between the biological sensor 930 (for example, the biological sensor 430 of FIG. 4) and the digitizer 923 may be larger than a width between the biological sensor 530 and the digitizer 523 shown in FIG. 5.

Figure 10:
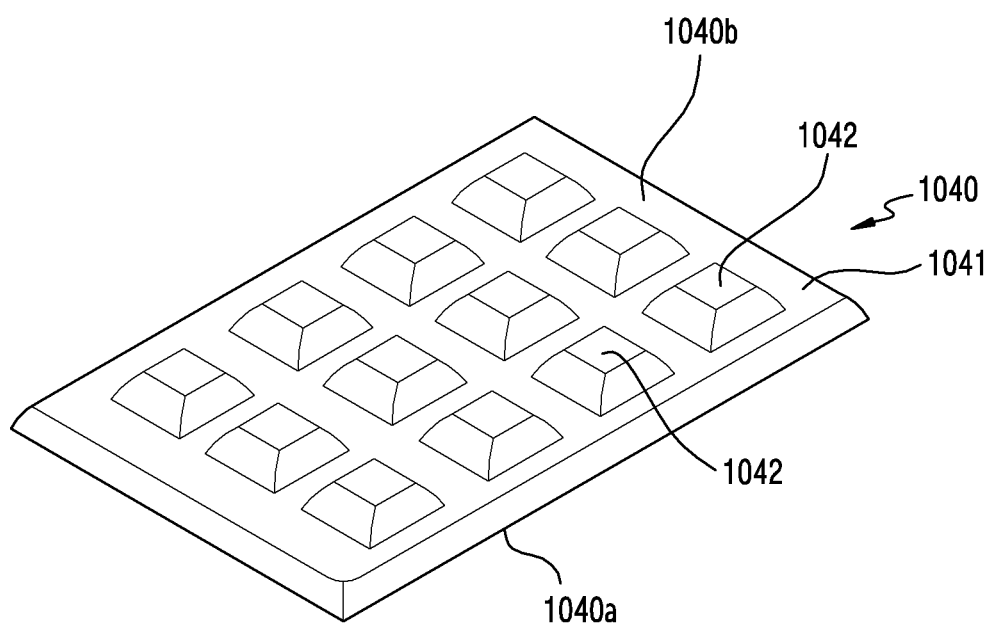
FIG. 10 is a perspective view illustrating an example acoustic lens according to various embodiments of the present disclosure.

FIG. 10 is a perspective view illustrating an example acoustic lens according to various embodiments of the present disclosure.

Referring to FIG. 10, the acoustic lens 1040 according to various embodiments may be the same as or similar to the acoustic lenses (for example, the acoustic lenses 440, 540, 640, 840 shown in FIGS. 4, 5, 6 and 8.

The acoustic lens 1040 according to various embodiments may be an acoustic guide member having an acoustic anisotropic characteristic. The acoustic lens 1040 may guide at least a portion of ultrasonic waves, which are sent from a biological sensor, for example, an ultrasonic sensor (for example, the biological sensor 430 of FIG. 4), are reflected from an external object (for example, a user's fingerprint, etc.) contacting the display panel (for example, the display panel 412 of FIG. 4), and are received at the biological sensor, to be received at a plurality of vibration elements.

The acoustic lens 1040 according to various embodiments may include a plate portion 1041 and protrusions 1042. The acoustic lens 1040 may include a first surface 1040a facing a first direction, and a second surface 1040b facing a second direction opposite to the first direction. The plurality of protrusions 1042 may be formed on the second surface 1040b. The protrusions 1042 may be arranged on the plate portion 1041 at equal intervals in the horizontal direction and the vertical direction. The respective protrusions 1042 of the acoustic lens 1040 may be disposed in contact with the biological sensor (for example, the biological sensor 430 of FIG. 4).

Figure 11A:
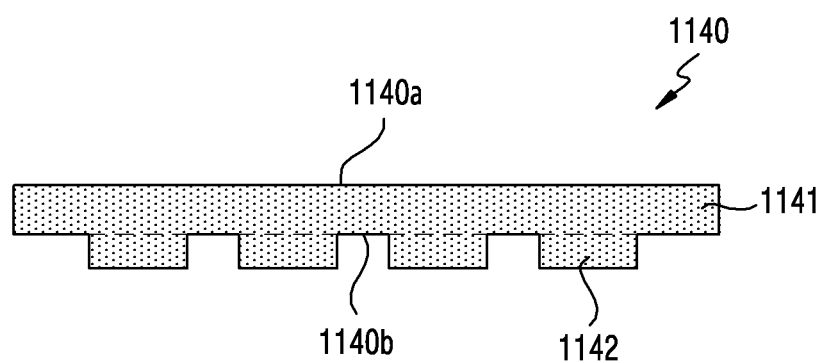
FIG. 11A is a cross-sectional view illustrating an example acoustic lens according to various embodiments of the present disclosure.

FIG. 11A is a cross-sectional view illustrating an example acoustic lens according to various embodiments of the present disclosure.

Referring to FIG. 11A, the acoustic lens 1140 according to various embodiments may be the same as the acoustic lenses (for example, the acoustic lenses 440, 540, 640, 840) illustrated in FIGS. 4, 5, 6 and 8.

The acoustic lens 1140 according to various embodiments may include a plate portion 1141 (for example, the plate portion 1041 of FIG. 10), and protrusions 1142. The acoustic lens 1140 may include a first surface 1140a facing a first direction, and a second surface 1140b facing a second direction opposite to the first direction. The plurality of protrusions 1142 may be formed on the second surface 1140b. The protrusions 1142 may be arranged on the plate portion 1141 at equal intervals in the horizontal direction and the vertical direction. The respective protrusions 1142 of the acoustic lens 1140 may be disposed in contact with a biological sensor (for example, the biological sensor 430 of FIG. 4). For example, each of the respective protrusions 1142 may be formed in any one of a substantially cuboidal shape or a cylindrical shape.

Figure 11B:
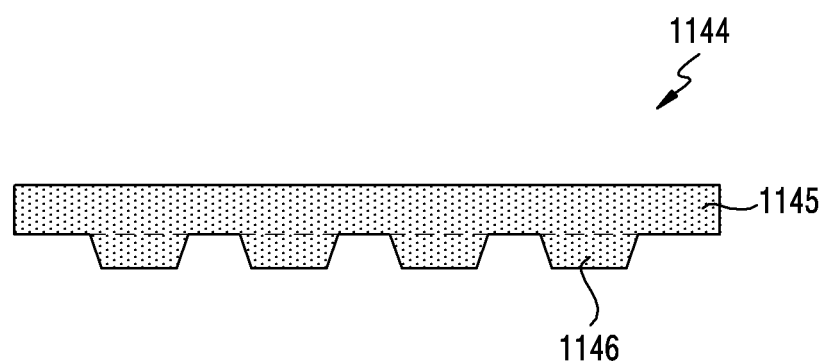
FIG. 11B is a cross-sectional view illustrating another example acoustic lens according to various embodiments of the present disclosure.

FIG. 11B is a cross-sectional view illustrating another example acoustic lens according to various embodiments of the present disclosure.

Referring to FIG. 11B, a difference of the acoustic lens 1144 according to various embodiments from the acoustic lens shown in FIG. 11A will be described, and the same or similar elements may be deleted to avoid a redundant explanation. The acoustic lens 1144 according to various embodiments may be the same as the acoustic lenses (for example, the acoustic lenses 440, 540, 640, 840) shown in FIGS. 4, 5, 6 and 8.

The acoustic lens 1144 according to various embodiments may include a plate portion 1145 and protrusions 1146. For example, the respective protrusions 1146 may be formed in a conical shape or a rectangular prism shape.

FIG. 12 is a top view illustrating an example of a filler injection inlet and a discharge outlet of a display according to various embodiments of the present disclosure.

Referring to FIG. 12, the display according to various embodiments may include an injection inlet 1261 to inject a filler 1250 (for example, the filler 450 of FIG. 4), and a discharge outlet 1262 to discharge air. The injection inlet 1261 and the discharge outlet 1262 may be formed on a sealing member (seal) 1260 (for example, the sealing member 460, 463 of FIG. 4, or the sealing member 560 of FIG. 5), but is not limited thereto, and may be formed on a housing of a biological sensor.

The sealing member (seal) 1260 according to various embodiments may include the injection inlet 1261 formed on one end thereof, and the discharge outlet 1262 formed on the other end thereof. The injection inlet 1261 may be a hole for putting the filler 1250 into a space formed by the sealing member, and the discharge outlet 1262 may be a hole for discharging air existing in the space. The injection inlet 1261 and the discharge outlet 1262 may be opposite to each other. When the filler 1250 is put into the space through the injection inlet 1261, the acoustic lens 1240 may be surrounded by the filler 1250.

When the filler 1250 is completely injected through the injection inlet 1261, and air is completely discharged, the injection inlet 1261 and the discharge outlet 1262 may be closed, respectively. The injection inlet 1261 and the discharge outlet 1262 may be closed by sealing portions 1270, 1272 (for example, the sealing members 470, 472 of FIG. 4), respectively.

FIG. 13 is a top view illustrating another example filler injection inlet and a discharge outlet of a display according to various embodiments of the present disclosure.

Referring to FIG. 13, the display according to various embodiments may further include auxiliary spaces 1351 formed at corner regions of a space formed using a sealing member 1360 (for example, the sealing member 460, 463 of FIG. 4, or the sealing member 560 of FIG. 5), in consideration of a change in volume caused by a change in temperature of a filler 1350 (for example, the filler 450 of FIG. 4) filling an opening. For example, the auxiliary spaces 1351, 1352, 1353 and 1354 may be formed at corner portions of the opening, or may be formed at one or two corner portions. The sealing member 1360 according to various embodiments may be formed to have shapes 1361, 1362, 1363 and 1364 according to addition of the auxiliary spaces 1351, 1352, 1353 and 1354. When the filler 1350 is put into the opening through the injection inlet 1365, an acoustic lens 1340 may be surrounded by the filler 1350.

The present disclosure has been described with reference to various example embodiments thereof. It will be understood by one skilled in the art that the present disclosure can be implemented in modified forms without departing from the spirit and scope of the present disclosure. Therefore, disclosed embodiments should be considered from a descriptive perspective, not from a limited perspective. The scope of the present disclosure is defined not by the detailed description but, for example, by the appended claims, and all differences within the scope should be understood as being included in the present disclosure.

What is claimed is:
1. An electronic device comprising:
 a transparent member comprising a transparent material;
 a display panel disposed under the transparent member;
 a shock absorption sheet disposed under the display panel, and having an opening formed in a region thereof;
 a biological sensor disposed to face the display panel, and disposed in at least a portion of the opening;
 a filler comprising a filler material filling at least some space in an opening formed between the biological sensor and the display panel; and
 a seal disposed between the biological sensor and the shock absorption member and configured to prevent the filler from being discharged outside the opening,
 wherein the seal comprises: an injection inlet disposed at one end of the seal and configured to allow the filler to be drawn in though the injection inlet; and a discharge outlet disposed at another end of the seal and configured to allow air to be discharged through the discharge outlet.

2. The electronic device of claim 1, wherein the biological sensor comprises at least one of: an ultrasonic sensor and an image sensor.

3. The electronic device of claim 1, wherein the seal is disposed between the display panel and the biological sensor, and is extended along a circumference of the opening to seal the filler material filling the at least some space.

4. An electronic device comprising:
 a transparent member comprising a transparent material;
 a display panel disposed under the transparent member;
 a biological sensor disposed in a region under the display panel to face the display panel;
 a filler comprising a filler material filling at least some space between the biological sensor and the display panel; and
 a seal disposed between the biological sensor and the display panel and configured to prevent the filler material from being discharged outside of the at least some space,
 wherein the seal comprises: an injection inlet disposed at one end of the seal and configured to allow the filler to be drawn in though the injection inlet; and a discharge outlet disposed at another end of the seal and configured to allow air to be discharged through the discharge outlet.

5. The electronic device of claim 4, wherein the biological sensor comprises an ultrasonic sensor, and an acoustic transmission coefficient of the filler is equal to an acoustic transmission coefficient of the display panel and an acoustic transmission coefficient of the ultrasonic sensor, or the acoustic coefficient of the filler has a value between the acoustic transmission coefficient of the display panel and the acoustic transmission coefficient of the ultrasonic sensor.

6. The electronic device of claim 4, wherein the biological sensor comprises a plurality of vibrators, and
 wherein the electronic device further comprises an acoustic guide disposed between the plurality of vibrators and the display panel and is configured to guide at least a portion of ultrasonic waves sent from the biological sensor, reflected from an external object contacting the display panel, and received at the biological sensor, to be received at the plurality of vibrators.

7. The electronic device of claim 6, wherein the acoustic guide comprises:
 a plate; and a plurality of protrusions aligned on one surface of the plate at substantially equal intervals in a horizontal direction and a vertical direction, and wherein the plurality of protrusions are disposed to be in contact with one surface of the biological sensor.

8. The electronic device of claim 7, wherein each of the protrusions comprises at least one of: a substantially cuboidal shape, a conical shape, and a cylindrical shape.

9. The electronic device of claim 4, wherein the filler material comprises a gel or epoxy material which is not cured within a specified temperature range.

10. The electronic device of claim 4, further comprising a sealing portion configured to close the injection inlet and the discharge outlet with the filler filling the at least some space.

11. The electronic device of claim 4, further comprising a digitizer disposed under the display panel.

12. The electronic device of claim 4, wherein an auxiliary space is further formed at each corner of the seal.

13. An electronic device comprising:
a display panel comprising a first surface facing a first direction, and a second surface facing a second direction opposite the first direction;
an opening formed under the display panel;
an ultrasonic sensor disposed in a portion of the opening to face the second surface of the display panel;
at least one seal disposed to surround the opening and being disposed between the display panel and the ultrasonic sensor, and configured to seal at least some region of the opening; and
a filler material filling a space between the display panel and the ultrasonic sensor defined by the at least one seal,
wherein the at least one seal comprises: an injection inlet disposed at one end of the seal and configured to allow the filler to be drawn in the space through the injection inlet; and a discharge outlet formed at another end of the seal and configured to allow air in the space to be discharged outside the space.

14. The electronic device of claim 13, further comprising an acoustic guide disposed above the ultrasonic sensor in the opening to face the first direction.

15. The electronic device of claim 13, further comprising a digitizer disposed under the display panel.

16. An electronic device comprising:
a display panel comprising a first surface facing a first direction, and a second surface facing a second direction opposite the first direction;
an opening formed under the display panel;
an ultrasonic sensor disposed in a portion of the opening to face the second surface of the display panel;
at least one seal disposed to surround the opening and being disposed between the display panel and the ultrasonic sensor, and configured to seal at least some region of the opening; and
a filler material filling a space between the display panel and the ultrasonic sensor defined by the at least one seal,
wherein the ultrasonic sensor comprises:
a sensor housing;
an injection inlet disposed at one end of the sensor housing and configured to allow the filler to be drawn in the space through the injection inlet; and
a discharge outlet disposed at another end of the sensor housing and configured to allow air in the space to be discharged outside the space.

* * * * *